3,309,416
PREPARATION OF ALPHA-OLEFINS
Ronald L. Poe and Eugene F. Kennedy, Ponca City, Okla., assignors to Continental Oil Company, Ponca City, Okla., a corporation of Delaware
Filed Jan. 18, 1962, Ser. No. 167,042
11 Claims. (Cl. 260—677)

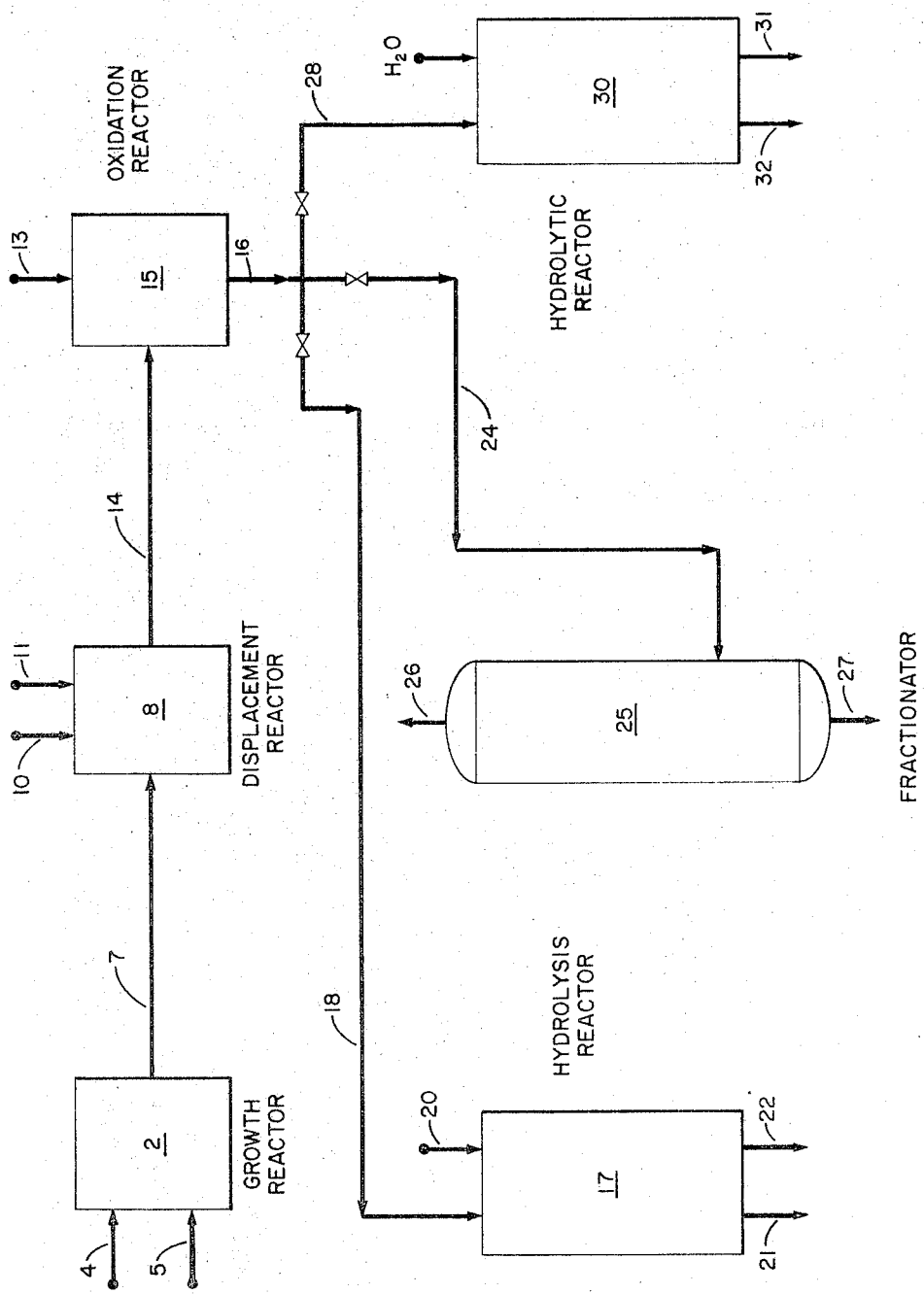

This invention relates to an improved method of producing high molecular weight alpha-olefins, and more particularly it is concerned with a method of producing such alpha-olefins from a growth product which is obtained by reacting low molecular weight aluminum trialkyl with a low molecular weight alpha-olefin.

It is well known that aluminum triethyl will react with ethylene to produce an aluminum product in which the alkyl substituents have increased in length by multiples corresponding to the number of moles of ethylene which have added to the ethyl groups. The resultant high molecular weight aluminum trialkyl can be further reacted with ethylene in the presence of a displacement catalyst whereby low molecular weight aluminum trialkyl, such as, aluminum triethyl, is obtained and high molecular weight olefins are formed. Preferably, the high molecular weight olefins would be separated from the low molecular weight aluminum trialkyls by distillation; however, it has been found that the reaction product tends to undergo reverse displacement and the high molecular weight olefins tend to isomerize and dimerize under the conditions required for distillation. It would therefore be an advantage to provide a method for recovering the high molecular weight alpha-olefin whereby these disadvantages would be obviated.

Therefore, an object of this invention is to provide an improved method of producing high molecular weight alpha-olefins from aluminum trialkyls.

Another object of this invention is to provide an efficient and economical method of producing high molecular weight alpha-olefins from aluminum trialkyls.

Still another object of this invention is to provide an improved method of separating high molecular weight alpha-olefins from the reaction product which results when aluminum alkyl growth product is reacted with ethylene in the presence of a displacement catalyst.

Other objects and advantages of this invention will become apparent from the following description and explanation thereof.

The foregoing objects are achieved broadly by subjecting a mixture of alpha-olefins and low molecular weight aluminum trialkyl to oxidation to convert the aluminum trialkyl to aluminum trialkoxide and separating the alpha-olefins from the oxidation product.

In one aspect of the invention, the mixture of alpha-olefins and low molecular weight aluminum trialkyl is obtained by reacting high molecular weight aluminum trialkyl with low molecular weight mono-olefin in the presence of a displacement catalyst.

By means of the present invention, aluminum trialkyls having alkyl substituents containing about 2 to 40 carbon atoms are reacted with a low molecular weight mono-olefin containing about 2 to 4 carbon atoms in the presence of a displacement catalyst thereby producing aluminum trialkyls in which the alkyl substituents contain about 2 to 4 carbon atoms and high molecular weight alpha-olefins containing about 2 to 40 carbon atoms. The reaction mixture containing low molecular weight aluminum trialkyls, high molecular weight alpha-olefins and displacement catalyst is then subjected to an oxidation treatment whereby the aluminum trialkyls are converted to aluminum trialkoxides without affecting significantly the high molecular weight alpha-olefins.

The separation of alpha-olefins from the aluminum trialkoxide may be conducted by one of several methods. The first method involves hydrolyzing the aluminum trialkoxide with an aqueous acid solution to produce an organic layer containing the high molecular weight olefin and the resultant alcohol, if it contains at least 4 carbon atoms, and an aqueous phase containing the aluminum salt and the resultant alcohol, if it contains 2–3 carbon atoms. The alpha-olefin is separated from the alcohol containing at least 4 carbon atoms by distillation or other suitable means. Similarly, the alcohol containing 2–3 carbon atoms can be separated from the aqueous phase by distillation. The second method involves distilling the total reaction mixture after oxidation to obtain the high molecular weight alpha-olefins in high purity as an overhead product. The residue or bottoms product of distillation can then be hydrolyzed to recover the alcohol in the manner described above. The third method involves hydrolyzing the aluminum trialkoxide with water to form alumina monohydrate. The hydrated alumina can be used to produce beta alumina. The alpha-olefin is readily separated by decantation from the hydrated alumina.

The growth reaction involves the reaction between a lower molecular weight aluminum trialkyl and a lower molecular weight alpha-olefin. Specifically, aluminum triethyl is reacted with ethylene to produce the growth product. The growth reaction is conducted at a temperature of about 65° to 150° F., more usually about 90° to 120° F., and at a pressure of about 200 to 5,000 p.s.i.g., more usually about 1,000 to 3,000 p.s.i.g. The relative quantities of aluminum trialkyl and low molecular weight alpha-olefin are selected on the basis of providing the statistical addition of the desired number of moles of low molecular weight alpha-olefin to the alkyl substituents in the low molecular weight aluminum trialkyl. Generally about 3 to 52 moles of low molecular weight alpha-olefin having about 2 to 4 carbon atoms are reacted with each mole of aluminum trialkyl having alkyl substituents containing about 2 to 4 carbon atoms. The reaction may be effected in the presence of a diluent, such as, a paraffin, cycloparaffin, aromatic hydrocarbon, etc., more specifically isooctane, benzene, xylene, and the like. The diluent serves to control the temperature of the growth reaction and also facilitates the handling of the growth product, because it acts as solvent for the same.

The growth product has alkyl substituents, each of which contains about 2 to 40 carbon atoms. This growth product may be designated as high molecular weight aluminum trialkyls. The growth product is reacted with a low molecular weight alpha-olefin containing about 2 to 4 carbon atoms to effect a displacement of the substituents with the olefin. In this way valuable high molecular weight alpha-olefins are produced. Preferably the reaction occurs between an aluminum trialkyl having alkyl groups which contain about 4 to 40 carbon atoms and an alpha-olefin containing about 2 to 4 carbon atoms. The displacement reaction is conducted at a temperature of about 50 to 350° C., more usually about 50 to 150° C., and at a pressure of about 2 to 100 atmospheres, more usually about 30 to 80 atmospheres. The relative quantities of reactants employed for the reaction is determined by the statistical amount required to effect complete replacement of the alpha-olefin for the alkyl substituents. Generally, about a stoichiometric amount to an excess of about 200 to 1,000 mole percent alpha-olefin per mole of growth product are employed. The reaction period is from about 0.01 to 30 minutes, more usually about 1 to 20 minutes.

The displacement reaction is carried out in the presence of a displacement or reduction catalyst. These are well-known to those skilled in the art and include nickel, cobalt, palladium and certain iron compounds. Specific examples are finely divided metallic nickel, Raney nickel, nickel acetylacetonate, nickel naphthenate, etc. The amount of catalyst may vary greatly, but usually about 0.001 to 0.1 percent, based on the weight of growth product, is used.

After the displacement reaction, the reaction product is then subjected to an oxidation treatment to convert the low molecular weight aluminum trialkyl having alkyl substituents which contain about 2 to 4 carbon atoms, or preferably about 2 carbon atoms, to the corresponding aluminum trialkoxide. This reaction is effected by means of an oxygen containing gas, such as, for example, oxygen, air, etc. About 10 to 50 moles, more usually about 15 to 25 moles of oxygen containing gas are used per mole of aluminum trialkyl of relatively low molecular weight. The oxidation reaction is conducted at a temperature of about 5° to 200° C., more usually about 20° to 100° C., and at a pressure of about 5 to 100 p.s.i.g., more usually about 10 to 60 p.s.i.g. The oxidation reaction, which may be continuous or batch, is carried out over a time from about 0.1 to 10 hours, more usually about 1 to 3 hours. The oxidation of the aluminum trialkyl is significant, because, as pointed out previously, undesirable side reactions occur when aluminum trialkyl, displacement catalyst and alpha-olefins are in contact with each other. After oxidation, the alpha-olefin can remain in contact with the aluminum trialkoxide for long periods of time without being affected substantially.

The separation of the alpha-olefin from the oxidation product may, as previously indicated, involve treatment with an aqueous acid solution to produc the alcohol from the aluminum trialkoxide. If the alcohol contains 2-3 carbon atoms, it will be present with the aqueous phase; otherwise it will be found with the desired alpha-olefins. The aqueous acid solution may be, for example, aqueous solutions of about 2 to 50 weight percent of $H_2SO_4$, HCl, etc. About 2 to 200 percent excess beyond the stoichiometric amount of aqueous acid solution are combined with one part by weight of the oxidation product. Subsequent to hydrolysis, the desired alpha-olefins are separated from the alcohol, if present by distillation. If the alcohol is not present, then the desired alpha-olefins are separated by decantation or otherwise and purified if necessary.

Alternatively, the oxidation product may be subjected to a separation treatment, such as, distillation, to recover the desired alpha-olefins as an overhead product. Thereafter, the bottoms or residue product may be subjected to hydrolysis by means of an aqueous acid solution.

Another alternative procedure is to treat the oxidation product with water to cause the alkoxide to be converted to alumina hydrate. Then the desired alpha-olefins are separated from the hydrolyzed product by decantation.

To provide a fuller understanding of the present invention, reference will be had to the accompanying drawing which forms a part of the present specification.

In the drawing, 3.58 moles of aluminum triethyl and 43 moles of ethylene are charged to a growth reactor 2 through supply lines 4 and 5, respectively. The growth product leaves the reactor 2 by means of line 7 and passes to a displacement reactor 8 in the amount of 1,612 grams. 13.3 moles of ethylene are charged to the displacement reactor 8 via line 10 along with 326 grams of nonane. 0.039 gram of nickel are charged to the displacement reactor 8 through line 11. In the reactor, the temperature is maintained at 104° C. and at a pressure of 500 p.s.i.g. The residence time of the reaction mixture in the displacement reactor 8 is 2.4 minutes.

The displacement product is discharged from reactor 8 by means of line 14 and is fed into an oxidation reactor 15. About 22.4 moles of air are fed to the reactor 15, through line 13 and wherein the temperature is maintained at 35° C., and at atmospheric pressure. The product is continuously oxidized as it leaves the displacement reactor. The reaction product leaves the reactor 15 via line 16. 2,294 grams of the reaction product in line 16 are fed to a hydrolysis reactor 17 through line 18. 4,737 grams of aqueous solution of 25 weight percent $H_2SO_4$ are charged to reactor 17 via line 20. The hydrolysis reaction takes place at a temperature of 60° C., and at atmospheric pressure. 1,867 grams of organic layer are discharged through line 21 and 4,709 grams of aqueous layer through line 22.

Alternatively, the oxidation product may pass from line 16 through line 24 and enter a fractionator 25. In the fractionator, the desired alpha-olefin is separated as an overhead product through line 26. The residue containing the aluminum trialkoxide is discharged through the bottoms line 27. The fractionator had a maximum overhead temperature of 190° C. and a maximum bottom temperature of 210° C.

The second alternative method is to feed the oxidation product from line 16 to line 28 and thence to the hydrolytic reactor 30. About 10–15 parts water per part alumina are fed to the reactor 30 wherein the temperature is maintained at 95° C. and at atmospheric pressure. The alumina hydrate thus produced is yielded through line 31, and the desired alpha-olefin is discharged through line 32.

The following example is presented to illustrate the effect of nickel displacement catalyst on displacement product:

*Example*

A nickel containing displacement product was allowed to stand for one hour at 100° C. The composition of the displacement product before and after standing is set forth in the table below:

TABLE

|  | Displacement Product (After Hydrolysis) | |
|---|---|---|
|  | Before Standing | After Standing |
| Paraffin Hydrocarbon, Percent | 4.3 | 22.0 |
| Alpha-olefins, Percent | 85.8 | 59.2 |
| Internal olefins, Percent | 9.9 | 18.8 |
|  | 100.0 | 100.0 |

As noted from the data in the table, almost one third of the alpha-olefins were converted via side reactions to either internal olefins or alkyl aluminum (which provides paraffin hydrocarbons on hydrolysis) in the presence of the displacement catalyst. This is compared to the example presented in the discussion of the drawing wherein substantially all of the olefins formed in the displacement product were recovered as alpha-olefins in the distillation step.

Having thus described the invention by providing a specific example thereof, it is to be understood that no undue limitations or restrictions are to be drawn by reason thereof and that many variations and modifications are within the scope of the invention.

What is claimed is:

1. A process for the production of alpha-olefins which comprises oxidizing a mixture comprising alpha-olefins containing 2 to 40 carbon atoms and aluminum trialkyl having alkyl groups containing 2 to 4 carbon atoms with a free oxygen-containing gas to convert the aluminum trialkyl to aluminum trialkoxide without affecting significantly the alpha-olefins and separating the alpha-olefins from the oxidation product.

2. A process for the production of alpha-olefins which comprises reacting high molecular weight aluminum trialkyl having alkyl substituents, each of which contains about 2 to 40 carbon atoms with a mono-olefin containing about 2 to 4 carbon atoms in the presence of a catalytic amount of a displacement catalyst to produce a first product including alpha-olefins containing about 2 to 40 carbon atoms and aluminum trialkyl having alkyl groups containing 2 to 4 carbon atoms, oxidizing the first product with a free oxygen-containing gas to convert the aluminum trialkyl to aluminum trialkoxide without affecting significantly the alpha-olefins and separating alpha-olefins from the oxidation product.

3. The process of claim 2 wherein the oxidation product is treated with an aqueous acid solution to convert the aluminum trialkoxide to alcohol and an aluminum salt of the said acid, and separating alpha-olefins from the hydrolysis product.

4. The process of claim 2 wherein the oxidation product is distilled to produce alpha-olefin as one fraction and aluminum trialkoxide as a separate fraction.

5. The process of claim 2 wherein the oxidation product is reacted with water to form a hydrolysis product including alpha-olefins and aluminum hydrate, and separating alpha-olefins therefrom.

6. The process of claim 2 wherein the mono-olefin is ethylene.

7. The process of claim 2 wherein the aluminum trialkyl having alkyl substituents, each of which contains about 2 to 40 carbon atoms is reacted with ethylene in the presence of a catalytic amount of a catalyst comprising nickel.

8. The process of claim 2 wherein the displacement catalyst is metallic nickel.

9. The process of claim 8 wherein the oxidation product is treated with an aqueous acid solution to convert the aluminum trialkoxide to alcohol and an aluminum salt of the said acid, and separating alpha-olefins from the hydrolysis product.

10. The process of claim 8 wherein the oxidation product is distilled to produce alpha-olefin as one fraction and aluminum trialkoxide as a separate fraction.

11. The process of claim 8 wherein the oxidation product is reacted with water to form a hydrolysis product including alpha-olefins and alumina hydrate, and separating alpha-olefins therefrom.

References Cited by the Examiner
UNITED STATES PATENTS

| | | | |
|---|---|---|---|
| 2,863,896 | 12/1958 | Johnson | 260—448 |
| 2,892,858 | 6/1959 | Ziegler | 260—632 X |
| 3,030,402 | 4/1962 | Kirshenbaum et al. | 260—448 |
| 3,053,905 | 9/1962 | Coyne et al. | 260—448 |
| 3,066,162 | 11/1962 | Fiegler et al. | 260—448 |
| 3,240,838 | 3/1966 | White et al. | 260—683.2 |

TOBIAS E. LEVOW, *Primary Examiner.*

A. LOUIS MONACELL, HELEN M. McCARTHY,
*Examiners.*

I. R. PELLMAN, H. M. S. SNEED,
*Assistant Examiners.*